United States Patent [19]
Massie

[11] Patent Number: 5,678,049
[45] Date of Patent: Oct. 14, 1997

[54] METHOD AND APPARATUS FOR THE REMOTE PROGRAMMING OF A POWER SUPPLY

[75] Inventor: Harold L. Massie, W. Linn, Oreg.

[73] Assignee: Intel Corporation, Santa Clara, Calif.

[21] Appl. No.: 254,249

[22] Filed: Jun. 6, 1994

[51] Int. Cl.$^6$ ..................................................... G06F 1/26
[52] U.S. Cl. .................................. 395/750; 364/483
[58] Field of Search ..................................... 395/750, 281, 395/282; 364/483; 363/74; 365/226; 307/31, 35

[56] References Cited

U.S. PATENT DOCUMENTS

| | | | |
|---|---|---|---|
| 4,438,498 | 3/1984 | Sekel et al. | 364/483 |
| 4,538,073 | 8/1985 | Freige et al. | 307/33 |
| 4,893,228 | 1/1990 | Orrick et al. | 363/89 |
| 5,019,996 | 5/1991 | Lee | 364/483 |
| 5,440,520 | 8/1995 | Schutz et al. | 365/226 |
| 5,481,730 | 1/1996 | Brown et al. | 395/750 |

*Primary Examiner*—Glenn A. Auve
*Attorney, Agent, or Firm*—Blakely, Sokoloff, Taylor & Zafman

[57] ABSTRACT

A computer system that includes supply programming circuits for remotely programming a power supply such that minimum operating voltages are maintained. The computer system includes a power supply having a supply output line and a supply sense line. The power supply provides a supply voltage via the supply output line in response to a sense voltage received via the sense line. A first circuit that operates at the supply voltage is coupled to the supply output line. A first supply programming circuit is coupled to the first circuit, the supply output line and the sense line. The first supply programming circuit senses rises the supply voltage at the first circuit and adjusts the sense voltage in response to the sensed supply voltage at the first circuit. A second circuit is also coupled to the supply output line. A second supply programming circuit senses the supply voltage at the second circuit and adjusts the sense voltage in response to the sensed supply voltage at the second circuit. Only the supply programming circuit that senses the lowest supply voltage adjusts the sense voltage.

13 Claims, 5 Drawing Sheets

METHOD AND APPARATUS FOR THE REMOTE PROGRAMMING OF A POWER SUPPLY

FIELD OF THE INVENTION

The present invention relates generally to power supplies and more particularly to the remote programming of a power supply in a computer system.

BACKGROUND OF THE INVENTION

Power supplies for computer systems are designed to provide the nominal operating voltages for the integrated circuit s of the computer systems within specified operating margins. While many integrated circuits operate according to transistor-to-transistor logic (TTL) and complementary metal oxide semiconductor (CMOS) voltage levels, some integrated circuit s operate according to uncommon nominal operating voltages. Further, narrower operating margins may be required. When integrated circuits having uncommon nominal operating voltages or narrower operating margins are introduced into a compute system, the power supply of the computer system must typically be modified to support such integrated circuits.

If several such integrated circuit s are used in a computer system, it may be difficult to ensure that the power supply delivers the nominal operating voltage within the operating margin to every integrated circuit. Losses due to the supply output line traces and the interfaces between printed circuit board and the integrated circuits can reduce the amount of power actually received by the integrated circuit.

It would be desirable to reduce the need to redesign the system power supply each time an integrated circuit having an uncommon unsupported operating voltage is introduced into the computer system. This would provide more flexibility to both circuit designers for designing integrated circuits. An appropriate solution would similarly provide system designers more flexibility in incorporating nonstandard circuits into computer systems. Further, it would be desirable to provide circuitry to better ensure that each integrated circuit receives an operating voltage within the specified operating margin.

SUMMARY AND OBJECTS OF THE INVENTION

Therefore, one object of the present invention is to reduce the need to redesign power supplies when integrated circuits having uncommon power requirements are introduced into a computer system.

Another object of the present invention is to better ensure that minimum operating margins are maintained for integrated circuits having narrow operating margins.

These and other objects of the present invention are provide for by a computer system that includes supply programming circuits for remotely programming a power supply such that minimum operating voltages are maintained. The computer system includes a power supply having a supply output line and a supply sense line. The power supply provides a supply voltage via the supply output line in response to a sense voltage received via the supply sense line. A first circuit that operates at the supply voltage is coupled to the supply output line. A first supply programming circuit is coupled to the first circuit, the supply output line and the supply sense line. The first supply programming circuit senses the supply voltage at the first circuit and adjusts the sense voltage in response to the sensed supply voltage at the first circuit. A second circuit is also coupled to the supply output line. A second supply programming circuit senses the supply voltage at the second circuit and adjusts the sense voltage in response to the sensed supply voltage at the second circuit. Only the supply programming circuit that senses the lowest supply voltage adjusts the sense voltage.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
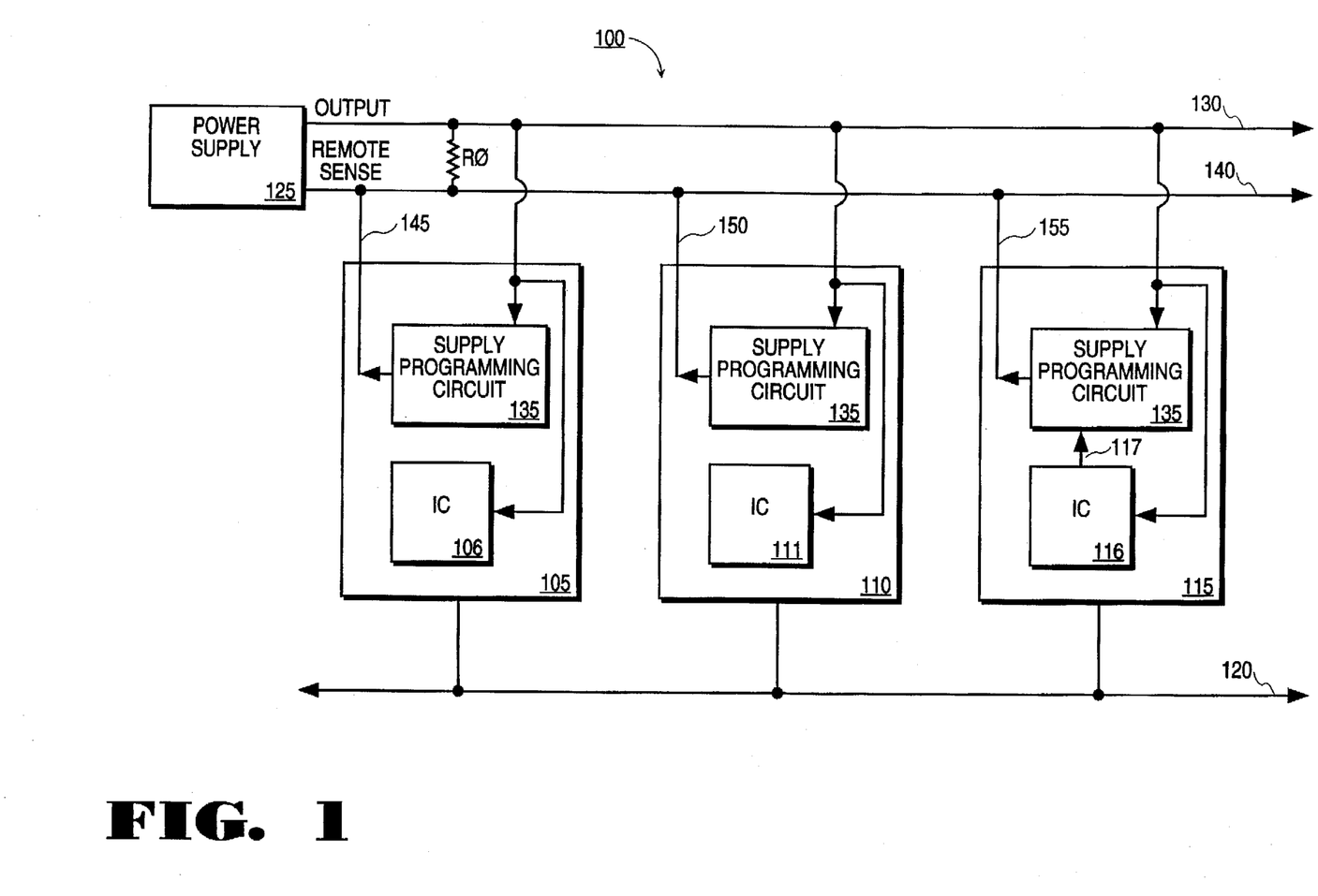
FIG. 1 shows a computer system according to one embodiment.

FIG. 1 shows a computer system according to one embodiment. Computer system 100 includes adapter cards 105, 110 and 115 which are coupled to bus 120. Power supply 125 provides a supply voltage $V_{out}$ to each of the adapter cards via supply output line 130. Each of the adapter cards include a supply programming circuit 135, the input of which is coupled to sense the supply voltage $V_{out}$ at supply output line 130. The output of each of the supply programming circuits 135 is coupled to a remote sense input of the power supply 125 via supply sense line 140. The supply programming circuit 135 for adapter card 105 is coupled to remote supply sense line 140 via signal line 145. The supply programming circuit 135 for adapter card 110 is coupled to remote supply sense line 140 via signal line 150. The supply programming circuit 135 for the adapter card 115 is coupled to the remote supply sense line 140 via signal line 155. Any number of adapter cards may be included in computer system 100. Finally, a resistor R0 may be coupled between the supply output line 130 and the supply sense line 140, depending on the type of supply programming circuits 135 that are used. This is discussed in more detail below.

Adapter cards 105, 110 and 115 are preferably adapter cards in a computer system that are coupled to the bus 120 via slots in the mother board of the computer system. Each of the adapter cards 105, 110 and 115 preferably have an identical operating voltage and include an integrated circuit (IC) that operates according to the operating voltage. For example, adapter card 105 includes IC 106, adapter card 110 includes IC 111, and adapter card 115 includes IC 116. Each of the ICs is shown as receiving the supply voltage directly from the supply output line 130, but IC 116 is shown as outputting a signal to the supply programming circuit 135 of adapter card 115 via signal line 117, which is optionally provided for instances when it is desirable for the IC of an adapter card to control the supply programming circuit. This will be discussed in greater detail below.

Each of the adapter cards 105, 110 and 115 may be, for example, central processing unit (CPU) cards that include a microprocessor such as the Pentium ™ microprocessor manufactured by Intel Corporation of Santa Clara, Calif. Of course, the supply programming circuits described herein may be used with any type of adapter card, and the ICs are not necessarily microprocessors.

Power supply 125 is a switching power supply that supplies a direct current (DC) output. Commercially available power supplies often include a remote sensing pin that is typically coupled to the output stage of the power supply, but may be coupled to the load. The remote sense pin closes a feedback loop which is used to determine the supply voltage $V_{out}$.

As shown in FIG. 1, each of the supply programming circuits 135 are connected in parallel to the supply output line 130 and the remote supply sense line 140. Ideally, each supply programming circuit 135 senses the same supply voltage level $V_{out}$ at supply output line 130. However, voltage drops resulting from the inherent impedance of supply output line 130 and from lossy connections between the adapter cards and the supply output line 130 result in the supply programming circuits 135 of the various adapter cards sensing different voltage levels. A voltage drop of up to 50–100 millivolts is not uncommon. The supply programming circuit 135 for adapter card 115 typically senses the lowest voltage level because it is located the farthest away from the power supply 125 on supply output line 130. Although each of the adapter cards 105, 110 and 115 has a supply programming circuit 135 inserted in the feedback loop of the supply output line 130 and the remote supply sense line 140, only the supply programming circuit 135 for the adapter card receiving the lowest supply voltage determines the supply voltage $V_{out}$ of the power supply 125.

Many modern integrated circuits have asymmetrical operating margins. For example, an integrated circuit having a 3.3 volt nominal operating voltage may have a maximum operating margin of plus 300 millivolts and a minimum operating margin of negative 150 millivolts. Thus, such an integrated circuit can operate so long as between 3.15 volts and 3.6 volts is supplied. The losses described above directly affect the amount of the minimum operating margin available for fluctuations in the supply voltage $V_{out}$ due to noise and other considerations. By allowing the adapter card that senses the lowest supply voltage to set the supply voltage $V_{out}$, minimum operating margins are maintained.

Each of the supply programming circuits 135 includes a voltage reference circuit having a better setpoint accuracy than the power supply 125. The voltage reference circuit may be, for example, a TL431A or equivalent. Precision voltage reference circuits are commercially available from a number of different sources. The inclusion of a high precision voltage reference circuit in the supply programming circuits 135 improves the precision of the supply voltage $V_{out}$ and allows for the use of an otherwise low precision power supply 125. The inclusion of the voltage reference circuit also allows the use of power supplies having standard nominal output voltages. Both of these features are provided by the fact that it is the voltage reference circuit of the supply programming circuit that determines the supply voltage of the power supply.

Figure 2:
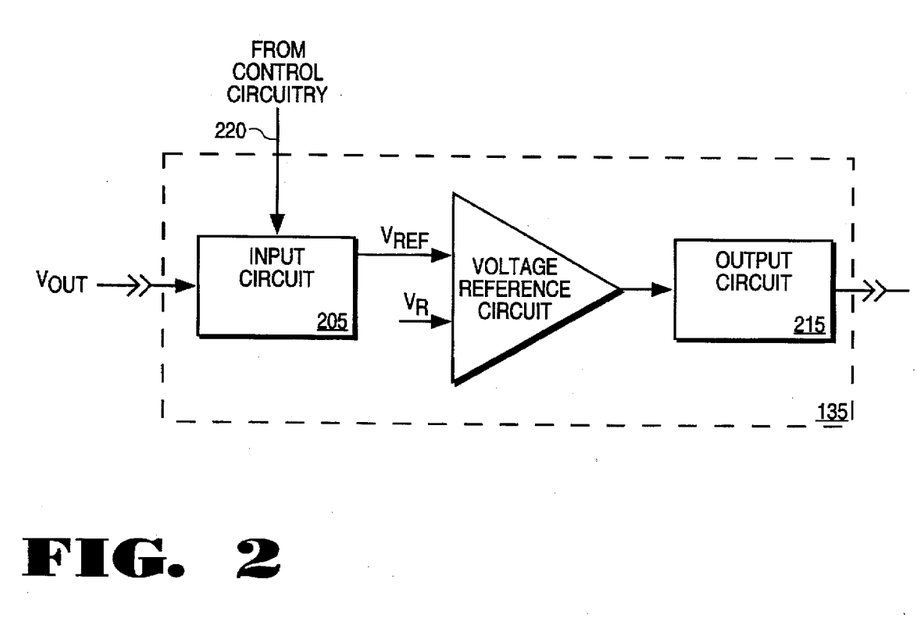
FIG. 2 is a block diagram of a supply programming circuit.

FIG. 2 shows a supply programming circuit in block diagram form. Each supply programming circuit 135 generally includes an input circuit 205, a voltage reference circuit 210, and an output circuit 215. The input circuit 205 is coupled to the supply output line 130 and generates a reference voltage $V_{ref}$ in response to the supply voltage $V_{out}$. The voltage reference circuit 210 compares the reference voltage $V_{ref}$ to an internal reference voltage $V_R$, the setpoint accuracy of which is equal to or greater than the setpoint accuracy of the power supply 125. The output circuit 215 is driven by the voltage reference circuit to output a voltage $V_{sense}$ in response to the comparison between the reference voltage $V_{ref}$ and the internal reference voltage $V_R$. Each supply programming circuit 135 may additionally be provided with a control input line 220 so that external control circuitry can control the operating characteristics of the supply programming circuit 135. The control input line 220 is shown as being coupled to input circuit 205 for varying the reference voltage $V_{ref}$. Optionally, control of the supply programming circuit can be achieved by varying the internal reference voltage $V_R$ of the voltage reference circuit 210, or by controlling the operating characteristics of the output circuit 215.

Figure 3:
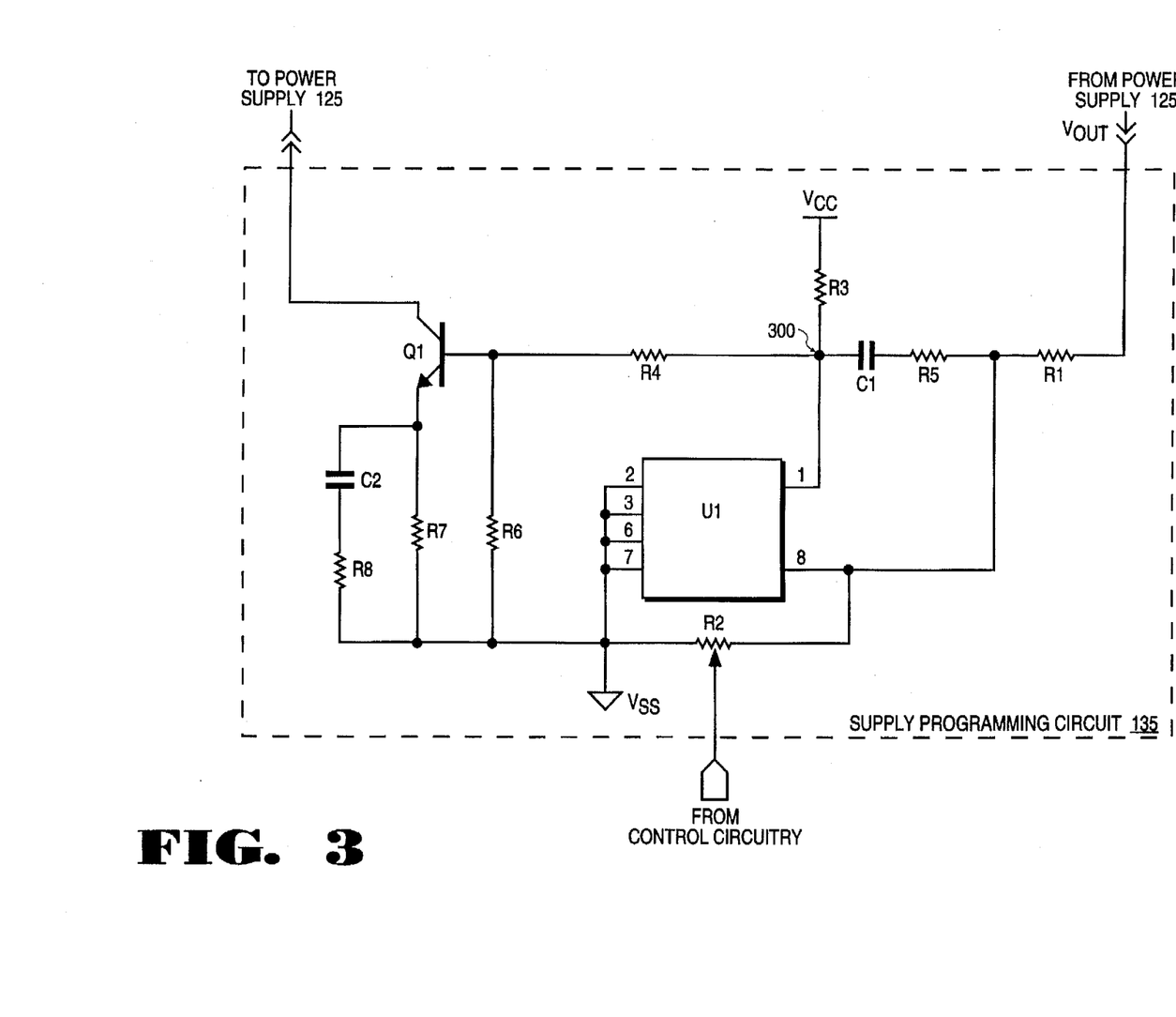
FIG. 3 shows a supply programming circuit of a first embodiment.

FIG. 3 shows a supply programming circuit according to one embodiment. For this embodiment, the resistor R0 is coupled between the supply output line 130 and the supply sense line 140 to provide a current for the supply programming circuits 135, which operates using current feedback. The supply programming circuit 135 acts primarily as a current sink that varies the $V_{sense}$ at the sense line 140.

Figure 4A:
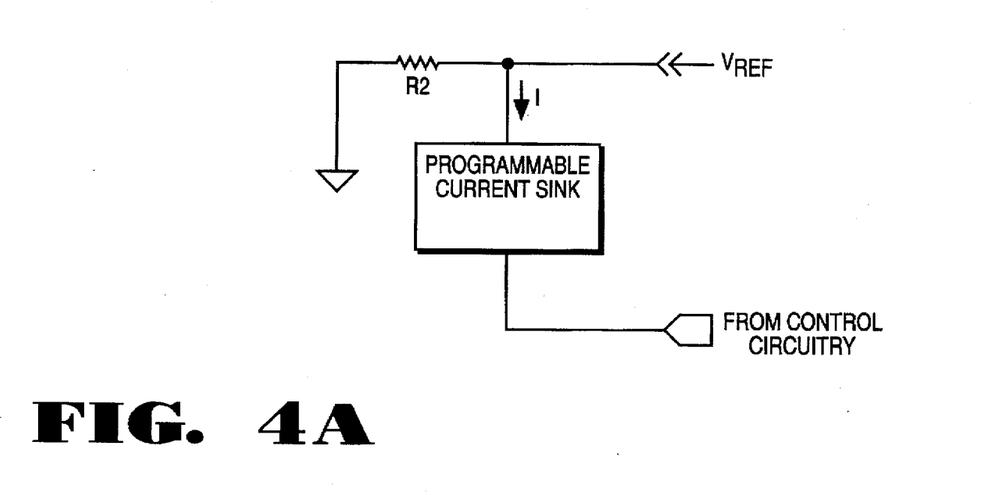
FIG. 4A shows a programmable resistive load.
Figure 4B:
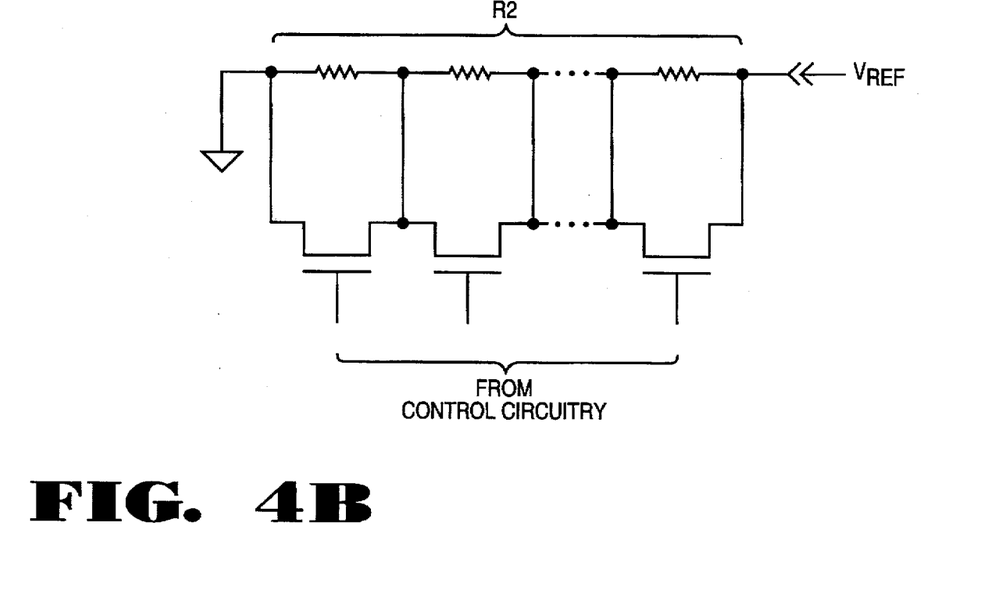
FIG. 4B shows a programmable resistive load.

The supply programming circuit 135 includes resistors R1–R8, capacitors C1 and C2, npn transistor Q1, and voltage reference circuit U1. Input circuit 205 is comprised of a voltage divider circuit formed by resistors R1 and R2. The reference voltage $V_{ref}$ is supplied at the node between the resistors R1 and R2. Resistor R2 may be a fixed resistor but is shown as a programmable resistive load, the resistance of which is programmed in response to a control signal from control circuitry, which may be the IC that is receiving the supply voltage $V_{out}$ from the power supply 125. For example, the IC may be a microprocessor. Examples of possible programmable resistive loads include a programmable current sink, as shown in FIG. 4A, and a programmable resistive ladder circuit, as shown in FIG. 4B.

The voltage reference circuit 210 is shown as voltage reference circuit U1, which may be any one of a number of commercially available integrated circuits. Voltage reference circuit U1 includes the pin designations of a TL431A or equivalent circuit. Pin 8 of voltage reference circuit U1 is the input pin and is coupled to the node between resistors R1 and R2 for sensing the reference voltage $V_{ref}$. Pin 1 of voltage reference circuit U1 is the output pin and is coupled to the input of the output circuit 215, which includes resistors R4, R6 and R7, and transistor Q1.

The voltage reference circuit U1, which may be a TL431A chip, acts as a variable current sink. The voltage reference circuit U1 compares the reference voltage $V_{ref}$ sensed at pin 8 to the internal voltage reference $V_R$. The result of the comparison determines the amount of current that the voltage reference circuit U1 sinks at pin 1. If the voltage sensed at pin 8 is more than the internal reference, the voltage reference circuit U1 sinks more current such that the current through the voltage divider of resistors R4 and R6 is reduced. The current through the voltage divider can be reduced to a predetermined minimum current $I_{min}$. If the voltage sensed at pin 8 is less than the internal reference, the voltage reference circuit U1 sinks less current such that the current through the voltage divider is increased. The current through the voltage divider can be increased up to a maximum current $I_{max}$.

Resistor R3 is coupled between voltage supply VCC and pin 1 of the voltage reference circuit U1 for providing a biasing current for the voltage reference circuit U1. The voltage supply VCC preferably provides 12 volts DC. The voltage at the base of transistor Q1 is determined by the amount of current that the voltage reference circuit U1 sinks in response to the comparison between the sensed voltage and the internal voltage reference. The voltage at the base of transistor Q1 is at a maximum $V_{Bmax}$ when the current sunk by the voltage reference circuit U1 is at a minimum such that the current through the voltage divider is the maximum current $I_{max}$. Conversely, the voltage at pin 1 is at a minimum $V_{Bmin}$ when the current sunk by the voltage reference circuit U1 is at a maximum such that current through the voltage divider is the minimum current $I_{min}$. The minimum base voltage $V_{Bmin}$ is chosen such that transistor Q1 conducts little or no current when $V_{Bmin}$ is applied to the base of transistor Q1.

As described above, the output circuit 215 includes resistors R4, R6 and R7, and transistor Q1. The amount of current through transistor Q1 determines the value of the sense voltage $V_{sense}$ and, ultimately, the value of the supply voltage $V_{out}$. Smaller Q1 currents result in greater sense voltages $V_{sense}$ and smaller supply voltages $V_{out}$. Thus, if the transistor Q1 conducts no current, the supply voltage $V_{out}$ is at a minimum level, which is the nominal supply voltage of the power supply 125 and is defined by the internal reference of the power supply 125. Therefore, the programming supply circuit 135 of the present embodiment acts only to increase the supply voltage $V_{out}$ above the nominal supply value.

Resistors R4 and R6 form a voltage divider circuit for setting a biasing voltage to the transistor Q1. Resistor R4 is coupled between pin 1 of the voltage reference circuit U1 and the base of transistor Q1. Resistor R6 is coupled between the base of the transistor Q1 and ground. The relative values of resistors R4 and R6 are preferably determined by the operating characteristics of the transistor Q1 and the voltage reference circuit U1. As shown, the resistors R3, R4 and R6 are chosen such that the voltage at node 300 swings between 2.5 volts when the voltage reference circuit U1 sinks a predetermined maximum current, and 10.0 volts when the voltage reference circuit U1 sinks a predetermined minimum current.

The transistor Q1 is coupled as a common-emitter amplifier wherein the collector of transistor Q1 is coupled to the supply sense line 140 and the emitter of transistor Q1 is coupled to resistor R7. As the base voltage of the transistor Q1 decreases, the current in the collector decreases, and the power supply 125 senses an increased sense voltage $V_{sense}$ via the supply sense line 140. Assuming that the supply programming circuit 135 is driving the feedback loop, an increased sense voltage $V_{sense}$ at the supply sense line results in the power supply 125 adjusting the supply voltage $V_{out}$ downward. Similarly, the power supply 125 adjusts the supply voltage $V_{out}$ upward if the sense voltage $V_{sense}$ at the supply sense line 140 decreases.

This circuit ensures that the supply programming circuit 135 that senses the lowest voltage drives the feedback loop if two or more supply programming circuits are coupled in parallel. This is because the supply programming circuit that senses the lowest supply voltage $V_{out}$ sinks current to increase the supply voltage $V_{out}$. The remaining supply programming circuits respond to the increased supply voltage by sinking less current. Because the supply programming circuit that senses the lowest supply voltage continues to sink current to maintain the expected supply voltage, the actions of the remaining supply programming circuits have no affect on the supply voltage $V_{out}$. In response, the remaining supply programming circuits continue to reduce their Q1 currents to the lowest possible value.

Returning to FIG. 1, if the supply programming circuit 135 of the adapter card 115 senses the smallest supply voltage and the sensed supply voltage is less than the internal reference, the voltage reference circuit U1 of supply programming circuit 135 responds by sinking less current to adjust the base voltage of transistor Q1 upwards, which causes the power supply to sense a decreased voltage $V_{sense}$ at the sense line 140. The power supply 125 responds by increasing the supply voltage $V_{out}$. The voltage reference circuits U1 of the other supply programming circuits 135 respond to the increased supply voltage $V_{out}$ by sinking more current, reducing the base voltage of the transistors Q1 to the minimum $V_{Bmin}$ such that the remaining transistors Q1 are effectively turned off. Because the supply programming circuit of adapter card 115 is driving the feedback loop, the attempts of the other supply programming circuits to drive the supply voltage $V_{out}$ lower are unsuccessful.

Returning to FIG. 3, the supply programming circuit 135 also includes: capacitor C1 and resistor R5 which are coupled in series between output pin 1 and sense pin 8; and capacitor C2 and resistor R8, which are coupled in series between the emitter of transistor Q1 and system ground VSS. These components are provided to perform frequency compensation to stabilize the feedback loop. The specific values of these components are chosen to provide the best frequency response in view of the capacitance of an adapter card.

Figure 5:
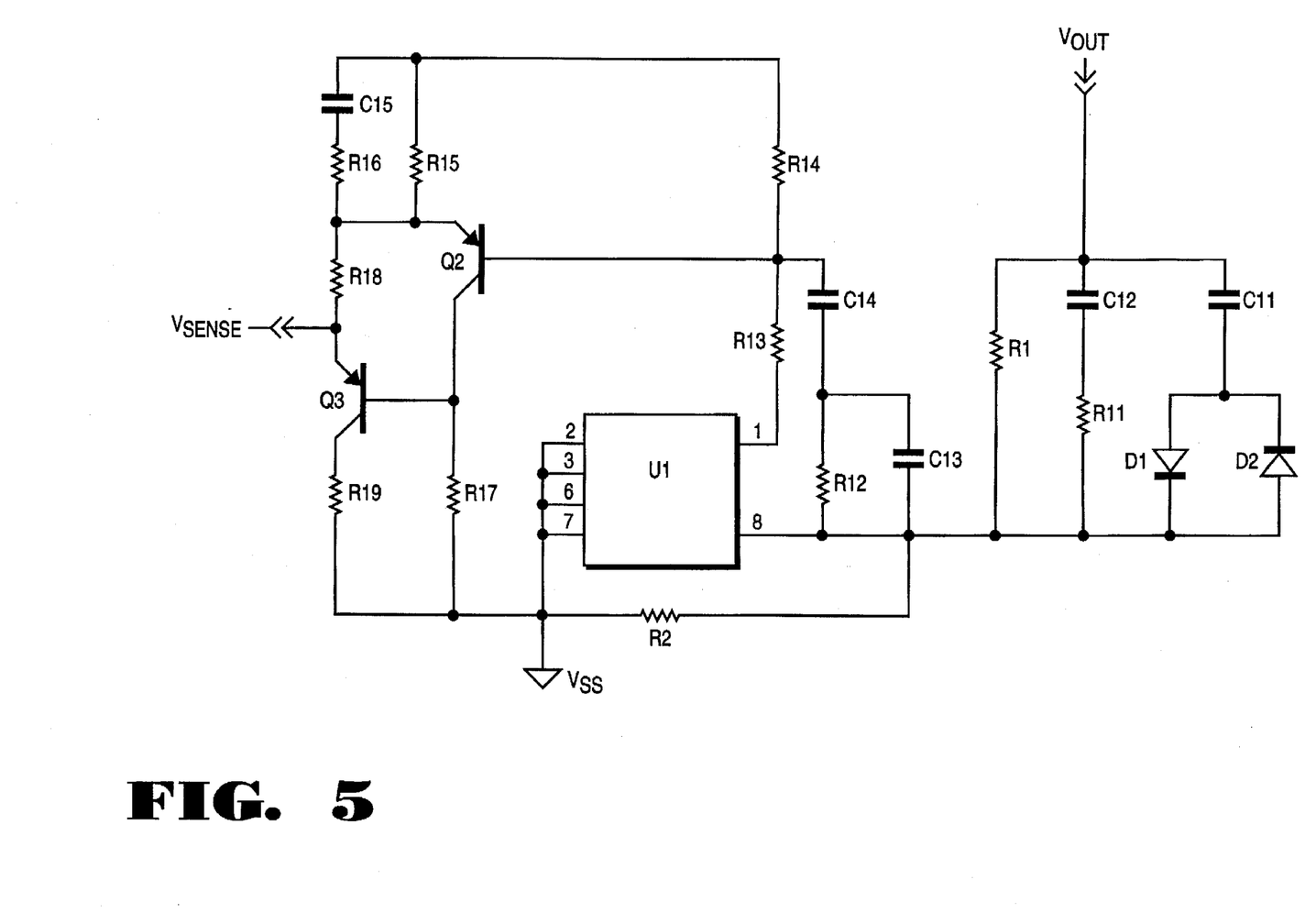
FIG. 5 shows a supply programming circuit of a second embodiment.

FIG. 5 shows a supply programming circuit according to a second embodiment. The resistor R0 is not required for this embodiment. The supply programming circuit 135 of this embodiment includes capacitors C11–C15, resistors R1–R2 and R11–R19, diodes D1 and D2, pnp transistors Q2 and Q3, and a voltage reference circuit U1, which is preferably identical to the voltage reference circuit U1 of the first embodiment. The supply programming circuit 135 of the present embodiment has a lower impedance than the previous embodiment and uses voltage feedback instead of the current feedback of the previous embodiment.

As with the first embodiment, the input circuit 205 includes a voltage divider circuit comprising resistors R1 and R2. Resistor R2 is shown as a fixed resistor but may be a programmable resistive load. The input circuit 205 further includes a slow start circuit comprising diodes D1 and D2, and capacitor C11. At power on of the power supply 125, the slow start circuit forces the power supply voltage Vout to be provided without overshoot. Capacitors C12–C15 and resistors R11–R12 and R16 provide frequency compensation to stabilize the feedback loop.

Reference voltage circuit U1 operates as described above. For this embodiment, the output circuit 215 includes resistors R13–R15 and R17–R19, and transistors Q2 and Q3. The biasing voltage at the base of transistor Q2 is set by the reference voltage circuit U1 via the voltage divider circuit of R13 and R14. As the current sunk by the reference voltage circuit U1 decreases towards the predefined minimum, the voltage at the base of transistor Q2 increases, which decreases the current $I_{Q2}$ conducted by transistor Q2. As the current $I_{Q2}$ decreases, the voltage at the base of transistor Q3 decreases, which decreases the voltage at the emitter of Q3, reducing the voltage $V_{sense}$ at the emitter of the transistor Q3. Similarly, as the reference voltage circuit U1 sinks more current, the voltage at the base of the transistor Q2 decreases, the current $I_{Q2}$ increases, and the voltage at the base of transistor Q3 increases, which increases the sense voltage $V_{sense}$ at the emitter of the transistor Q3. Transistor Q3 is coupled as an emitter follower, which provides a low impedance drive to the supply sense line 140.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A computer system comprising:

a bus;

a power supply including a supply output for supplying a supply voltage, a sense input for receiving a sense voltage, and circuitry for adjusting the supply voltage in response to the sense voltage;

a supply output line coupled to the power output of the power supply for carrying the supply voltage;

a sense line coupled to the sense input of the power supply for carrying the sense voltage;

a first adapter card coupled to the bus and to the supply output line at a first position, the first adapter card including:

a first circuit coupled to receive the supply voltage from the supply output line;

a first supply programming circuit coupled to the sense line and coupled to sense the supply voltage received by the first circuit;

a second adapter card coupled to the bus and to the supply output line at a second position, the second adapter card including:

a second circuit coupled to receive the supply voltage from the supply output line; and a second supply programming circuit coupled to the sense line and coupled to sense the supply voltage received by the second circuit, wherein a one of the first and second supply programming circuits that senses a lowest value of the supply voltage received by its respective circuit outputs the sense voltage.

2. The computer system of claim 1, wherein the first and second supply programming circuits adjust the sense voltage by sinking current.

3. The computer system of claim 1, wherein each of the first and second supply programming circuits includes:

an output circuit coupled to the sense line for adjusting the sense voltage; and, a voltage reference circuit coupled to the supply output line and the output circuit for making a comparison between a sensed supply voltage and an internal reference voltage, and for driving the output circuit in response to the comparison.

4. The computer system of claim 3, wherein each of the first and second supply programming circuit further includes:

an input circuit coupled between the supply output line and the voltage reference circuit, the input circuit for outputting a reference voltage in response to the sensed supply voltage, wherein the voltage reference circuit compares the reference voltage to the internal reference voltage.

5. The computer system of claim 4, wherein each input circuit includes a first resistor and a second resistor coupled in series between the supply output line and system ground, the reference voltage being output at a node between the first resistor and the second resistor.

6. The computer system of claim 5, wherein the second resistor is a variable resistive load having a resistance that is varied in response to a control signal.

7. The computer system of claim 6, wherein the control signal is provided by a processor.

8. The computer system of claim 3, wherein each output circuit comprises:

a transistor having a base coupled to the voltage reference circuit, a collector coupled to the sense line, and an emitter, wherein the sense voltage at the collector varies inversely with a base voltage driven by the voltage reference circuit.

9. The computer system of claim 3, wherein each output circuit comprises:

a first transistor having a base coupled to the voltage reference circuit, a collector, and an emitter, wherein a collector voltage of the first transistor varies inversely with a base voltage driven by the voltage reference circuit;

a second transistor having a base coupled to the collector of the first transistor, an emitter coupled to the sense line, and an emitter, wherein the sense voltage at the collector varies with the collector voltage of the first transistor.

10. The computer system of claim 1, wherein the first supply programming circuit shuts off if the second supply programming circuit adjusts the sense voltage.

11. The computer system of claim 1, wherein each of the first and second supply programming circuits includes a voltage reference circuit of higher precision than the power supply such that the supply voltage has operating margins determined by the voltage reference circuit.

12. The computer system of claim 1, wherein the first and second circuits are microprocessors.

13. A method for remotely programming a supply voltage of a power supply such that minimum operating voltages are maintained, the method comprising the steps of:

sensing of the supply voltage by a first supply programming circuit at a first position of a supply output line to produce a first sensed supply voltage;

sensing of the supply voltage by a second supply programming circuit at a second position of the supply output line to produce a second sensed supply voltage;

outputting a sense voltage by the first supply programming circuit if the first sensed supply voltage is less than the second sensed supply voltage;

outputting the sense voltage by the second supply programming circuit if the second sensed supply voltage is less than the first sensed supply voltage; and, adjusting the supply voltage by the power supply in response to the sense voltage.

* * * * *

UNITED STATES PATENT AND TRADEMARK OFFICE
CERTIFICATE OF CORRECTION

PATENT NO. : 5,678,049
DATED : October 14, 1997
INVENTOR(S) : Harold L. Massie

It is certified that error appears in the above-identified patent and that said Letters Patent is hereby corrected as shown below:

In column 1 at line 22 delete "compute" and insert --computer--

In column 7 at line 53 delete "circuit" and insert --circuits--

Signed and Sealed this

Seventeenth Day of March, 1998

Attest:

BRUCE LEHMAN

Attesting Officer

Commissioner of Patents and Trademarks